United States Patent [19]

Stone

[11] 4,119,700

[45] Oct. 10, 1978

[54] PRODUCTION OF PHARMACEUTICAL BARIUM SULPHATE

[76] Inventor: Dennis W. J. Stone, 253 Westcroft Ave., Beaconsfield, P.O., Canada

[21] Appl. No.: 841,607

[22] Filed: Oct. 12, 1977

Related U.S. Application Data

[63] Continuation-in-part of Ser. No. 699,325, Jun. 24, 1976, abandoned.

[51] Int. Cl.$^2$ .............................................. C01F 11/46
[52] U.S. Cl. ..................................... 423/156; 209/39; 423/170
[58] Field of Search ....................... 423/554, 156, 170; 209/39, 214; 241/184

[56] References Cited

U.S. PATENT DOCUMENTS

| | | | |
|---|---|---|---|
| 1,533,779 | 4/1925 | Washburn | 423/554 |
| 2,159,909 | 5/1939 | Price | 423/554 |
| 2,847,169 | 8/1958 | Hartman | 241/184 |
| 3,008,656 | 11/1961 | Weston | 241/184 |

OTHER PUBLICATIONS

Lawuer et al., "Wet Magnetic Separation of Weakly Magnetic Particles", Minerals Sci. Engrg, vol. 6, No. 3 (Jul. 1974).

Sherman, "Sink–Float Processes", Chemical Engineering (Jan. 1949), pp. 106–115.

*Primary Examiner*—O. R. Vertiz
*Assistant Examiner*—Wayne A. Langel

[57] ABSTRACT

A new simplified process is described for producing pharmaceutical barium sulphate in which the barium sulphate does not require dissolution for purification. The new process comprises grinding a naturally occurring barite ore containing individual crystals of substantially pure barium sulphate together with gangue minerals to form a finely divided particulate ore material, passing this finely divided ore through a high intensity wet magnetic separator to remove magnetic particles, leaving a non-magnetic fraction containing barium sulphate and low specific gravity minerals, subjecting the non-magnetic fraction to gravity separation to separate a substantially pure barium sulphate fraction, subjecting this barium sulphate fraction to further grinding in an attrition mill with a particulate grinding medium which is non-contaminating of the pure barium sulphate to form a finely divided barium sulphate having a maximum particle size in the order of about 1 micron, leaching the barium sulphate fraction with sulphuric or hydrochloric acid to remove acid soluble impurities and washing the leached product.

7 Claims, No Drawings

PRODUCTION OF PHARMACEUTICAL BARIUM SULPHATE

BACKGROUND OF THE INVENTION

Field of the Invention

This invention relates to a process for producing a pharmaceutical grade of barium sulphate, and is a continuation-in-part of Ser. No. 699,325 filed June 24, 1976, now abandoned.

DESCRIPTION OF THE PRIOR ART

Pharmaceutical barium sulphate is widely used as a radiopaque medium in the gastrointesinal tract. It is a fine, white, odourless, tasteless bulky powder which is practically insoluble in water, in organic solvents and in solutions of acids and of alkalies. It does, however, exhibit some solubility in hot concentrated sulphuric acid. While this extremely inert quality of barium sulphate makes it ideal as a radiopaque medium, it has also in the past created great problems in the production of barium sulphate of pharmaceutical purity.

The chemical specifications of pharmaceutical barium sulphate are precisely known. The USP specifications can be summarized as follows:

| Test | USP Specifications |
| --- | --- |
| Heavy Metals (as Pb) | 0.0010% maximum |
| Sulphide | To pass test |
| Arsenic | 0.0001% maximum ($As_2O_3$) |
| Acid Soluble Substance | 0.3% maximum |
| Soluble Barium Salts | To pass test |
| Phosphate | To pass test |
| Acid or Alkalinity | To pass test |

The usual commercial procedure now being used is the Mallinckrodt process in which finely divided barite ore is taken into solution by means of an acid and then precipitating barium sulphate. Because of the inertness of barium sulphate, this is a very difficult and expensive procedure. Even the precipitate formed still contains many impurities and must be subjected to a number of additional purification steps including acid leaching.

It is the object of the present invention to provide a simpler and less expensive process for producing pharmaceutical barium sulphate.

SUMMARY OF THE INVENTION

In accordance with the present invention, it has surprisingly been found that a greatly simplified procedure for producing pharmaceutical barium sulphate is possible by commencing with a naturally occurring barite ore which contains individual crystals of substantially pure barium sulphate. In other words, the barium sulphate within the individual crystals is of pharmaceutical purity.

According to the inventive process, this naturally occurring barite ore containing individual crystals of substantially pure barium sulphate, together with gangue minerals, is first ground to form a granular ore material having a particle size of −35 mesh (U.S. sieve). This granular ore is then passed through a high intensity wet magnetic separator to remove magnetic particles, leaving a non-magnetic fraction containing barium sulfate and low specific gravity minerals. The non-magnetic fraction is subjected to gravity separation and from this gravity separation a substantially pure barium sulphate fraction is obtained. The pure barium sulphate fraction in granular form thus obtained is then ground in an attrition mill with a particulate grinding medium which is non-contaminating of the pure barium sulphate to form a pure barium sulphate powder. This barium sulphate powder is then subjected to leaching with sulphuric or hydrochloric acid to remove any remaining acid soluble impurities and is washed to form a final pharmaceutical barium sulphate.

The barium sulphate obtained by this procedure easily meets all of the USP specifications.

DESCRIPTION OF PREFERRED EMBODIMENTS

Preparation of Ore

The ore contains, in addition to the individual crystals of substantially pure barium sulphate, many other gangue minerals. These gangue minerals typically include iron carbonate, iron oxides, silica and iron silicates.

One example of a typical ore analysis is as follows:

| | |
| --- | --- |
| $BaSO_4$ | 74.4% |
| $FeCO_3$ | 18.6% |
| $SiO_2$ | 5.6% |
| Miscellaneous | 1.4% |

However, it will be appreciated that the gangue minerals and their proportions can vary greatly in relation to the barium sulphate and the main consideration is that the lower the amount of barium sulphate present in the ore, the greater amount of ore that will have to be prepared and processed through the wet magnetic separator to obtain a given amount of barium sulphate.

The ore as obtained from the mine is preferably subjected to an initial crushing with care being taken to keep the production of fine particles to a minimum. This can conveniently be done, for instance, by means of a jaw crusher followed by a gyratory crusher or other means to reduce the particles to a convenient working size of, for instance, ½ inch.

These ore particles are then subjected to grinding, for instance in a ball mill, rod mill or hammer mill, to produce a granular ore suitable for feeding to a high intensity wet magnetic separator. This separator feed has a particle size of −35 mesh ( U.S. seive) with care being taken to avoid excessive fines.

The size of the particles can be varied depending on the nature of the ore deposits with the concept being to form particles among which there will be a large number of individual particles of substantially pure barium sulphate.

Magnetic Separation

The suitably ground ore is subjected to high intensity wet magnetic separation and a variety of high intensity wet magnetic separators are known. A particularly suitable machine is the Jones separator.

The ground ore can be passed through the separator one or more times to remove as much of the magnetic particles as possible. The ore will contain particles of varying degrees of magnetic susceptabality and, for instance, there may be combined particles of iron carbonate and silica where the combined particle, due to its iron carbonate content, is sufficiently magnetic to remove the entire particle. It is also sometimes desirable to size the feed to the separator since better results may be obtained if the feed does not contain particles of too greatly varying sizes. For instance, the ore feed to the separator could be divided into three different size ranges for feeding, e.g. −10 + 35; −35 + 65; −65 + 100 mesh.

During the magnetic separation, the bulk of the magnetic minerals or combined particles that as a whole exhibit some magnetic susceptability are removed. The non-magnetic fraction at this stage contains primarily barium sulfate and the lighter specific gravity minerals such as quartz, as well as other contaminants such as lead, zinc, etc.

The magnetic separation step in accordance with this invention is totally different for previous separations of barite ores, such as that described in Price, U.S. Pat. No. 2,159,909. That patent was concerned with producing barium sulfate of pigment purity which is much less pure than U.S.P. purity. Price roasted the ore at a temperature of about 600° C. before magnetic separation to increase magnetic susceptibility but it has been found that this is not capable of producing barium sulfate meeting U.S.P. specifications. The reason for this is because barite and iron oxide when heated between 500° and 1000° C. form barium ferrite. Traces of this barium ferrite remain as a coating or stain on barium sulfate particles and, since barium ferrite is an extremely inert material, it cannot be removed by ordinary leaching techniques. These traces of barium ferrite remaining on the final barium sulfate cause the barium sulfate to fail the U.S.P. specifications. Thus, it is essential in accordance with this invention to rely on the inherent magnetic susceptibility of iron oxides and iron carbonates in the barite ores and to separate these from the barium sulfate by means of a high intensity wet magnetic separator.

GRAVITY SEPARATION

Much of the undesirable material remaining in the non-magnetic fraction obtained from the magnetic separator can be removed by gravity separation. A variety of gravity separators are known and a highly useful one for this purpose is the wet shaking table. Once again, it may be desirable to break the non-magnetic fraction up into quite restricted size ranges by screening prior to the gravity separation. This tends to give a better separation.

The "heavys" end of the table contains predominantly barium sulfate while the "lights" end contains the gangue. There may be a fraction removed in between these that, on completion of the leaching process, does not meet pharmaceutical specifications, but it has been found that this fraction normally meets the requirements for a commercial product known as "Ground White Barite".

SECONDARY GRINDING

The barium sulphate obtained from the gravity separation is essentially pure with only minor discoloration and some minor remaining soluble impurities, such as soluble barium salts, etc. It is also granular, having the consistency of sand. Thus, it must be ground to a powder consistency such as to meet the U.S.P. specification sedimentation test and any minor impurities, coloration, etc. must be removed to obtain the final product. This secondary grinding presented problems of obtaining a sufficiently small particle size and avoiding further contamination of the barium sulphate. For instance, the usual rod or ball mills could not produce a sufficiently fine grind and there was some tendency during this rod or ball milling to cause contamination of the barium sulphate which could not be removed during subsequent treatment. However, the use of an attrition mill with an appropriate grinding medium is uniquely capable of producing a sufficiently fine grind of barium sulphate while avoiding further contamination.

The U.S.P. Sedimentation test which must be met is as follows:

Sedimentation

Place 5.0 g. in a 50-ml. stoppered measuring cylinder having the 50-ml. graduation mark between 8.5 and 11.5 cm. above the 5-ml. graduation mark, add 30 ml. of water, shake for 3 minutes, add sufficient water to produce 50 ml., shake for 2 minutes, and allow to stand for 15 minutes; the upper level of the barium sulphate is not below the 20-ml. graduation mark.

In order to satisfy the above test the barium sulphate should have particle sizes in the order of about 1 micron or less.

To avoid contamination during the secondary grinding, the grinding medium should be selected with some care and materials such as steel shot, nickel shot and stainless alloy shot are highly satisfactory. In terms of quality of product the nickel shot and stainless alloy shot are superior, but they are more expensive than carbon steel shot. Another expensive but superior shot for this purpose is tungsten carbide shot. The shot used typically has diameters of less than about ¼ inch, with diameters of less than about ⅛ inch being particularly desirable.

Leaching

The purpose of the leaching step is to eliminate any remaining soluble impurities, such as soluble barium salts etc. which must be eliminated in order to pass the specified test. In order to obtain a product meeting USP specifications, it has been found that the leaching must be conducted with sulphuric or hydrochloric acid.

A convenient technique for this is a counter-current three-stage leach starting with b 25% commercial sulphuric acid with commercial tap water and three washing steps. Of course, these steps can be greatly varied depending on the concentration of the acid used, economics, grade of water, etc.

Another technique involves a single stage leaching system in which a slurry of the barium sulfate and acid (conveniently 25% by weight commerical grade hydrochloric acid based on the barium sulate) is continuously mixed in a drum by slowly rotating the drum. The leaching drum can be tiltable so that it may be tilted to drain off acid after completion of the leaching. Washing of the leached barium sulfate can also be carried out in the drum by continuously allowing wash water to run into the drum and allowing the water to overflow the top. At completion of the washing the drum can be tilted to drain off wash water and can then be tilted further to dump out the leached and washed barium sulfate.

In order to reduce acid consumption, the leaching can be carried out in two stages. The first stage then uses spent acid from a previous leach and the second stage uses fresh acid.

The product obtained from the leaching step is filtered and washed and can either be made up in plastic bags in the form of pre-mixed dosage units or it may be dried screened and packaged as a dry powder.

EXAMPLE I

An ore sample was obtained from a mine located at Brookfield, Nova Scotia, Canada. This ore had the following analysis:

| | |
|---|---|
| $BaSO_4$ | 74.4% |
| $FeCO_3$ | 18.6% |
| $SiO_2$ | 5.6% |
| Miscellaneous | 1.4% |

The ore was reduced in size by means of a jaw crusher to form pieces having a dimension of about ½ inch. These pieces were then passed through a hammer mill to produce a granular ore having particles of −35 mesh.

This granular ore was passed through a "Standard Laboratory Jones High Intensity Wet Magnetic Separator" with a maximum amperage to coils of 40 amperes to obtain 44% by weight of a magnetics fraction and 56% by weight of a non-magnetics fraction. The non-magnetic fraction was screened into the following size fractions:

−35 + 60 mesh
−60 + 150 mesh
−150 mesh

Each of the above fractions was subjected to gravity separation on a wet table no. 11099 available from Deister Concentrating Company, Inc. and three cuts were made of the heavys product. In other words, the heavys product was removed from the wet table as three separate fractions. The weight distribution of these various fractions is shown in Table 1 below:

TABLE 1

| Particle Size | −35 + 60 | | | −80 + 150 | | | −150 | | |
|---|---|---|---|---|---|---|---|---|---|
| Wet Table Cut | C-1 | C-2 | C-3 | C-1 | C-2 | C-3 | C-1 | C-2 | C-3 |
| % Wt. $BaSO_4$ Based on Orig. Feed | 12.0 | 4.7 | 1.9 | 1.7 | 0.9 | 0.9 | 2.0 | 2.6 | 1.3 |
| Total $BaSO_4$ (% wt.) | | | | 28.0% | | | | | |

The various fractions obtained were then passed through a continuous attrition mill as described in U.S. Pat. No. 3,698,647, using a grinding medium, carbon steel shot having an average diameter of less than about ⅛ inch. Finely divided fractions were thus obtained having particle sizes in the order of 1 micron or less.

The finely ground fractions obtained were then subjected to leaching with 20% sulphuric acid solutions using a counter current four stage procedure with analytical grade and commercial grade sulfuric acid and either tap water or distilled water. Each leaching stage was of 30 minutes duration and the leaching procedures used on the various fractions are set out in Table 2 below:

TABLE 2

| Product No. | Source | Relevant Process Differences |
|---|---|---|
| 117 | | Analytical grade $H_2SO_4$ and |
| 118 | All C-1's | distilled water wash. All |
| 119 | | leaching on −150 mesh. |
| 131 | C-1, C-2, | Analytical grade $H_2SO_4$ and |
| 132 | C-3 | tap water wash. Leaching on |
| 133 | (−35+60) | finely ground. |
| 134 | C-1, C-2 | Analytical grade $H_2SO_4$ and |
| 135 | C-3 | tap water wash. Leaching on |
| 136 | (−60+150) | finely ground ground. |
| 137 | C-1, C-2, | Analytical grade $H_2SO_4$ and |
| 138 | C-3 | tap water wash. Leaching on |
| 139 | (−150) | finely ground. |
| 145 | C-1 | Commerical grade $H_2SO_4$ and tap |
| 146 | (−35+60) | water. Leaching on −150 mesh. |
| 147 | C-1 | Three stage commercial grade $H_2SO_4$ |
| 148 | (−35+60) | Last stage analytical with top water wash. Leaching on −150 mesh. |

The above samples were submitted to an independent testing laboratory for the prescribed tests required under the USP specifications. The results of these tests are given in Table 3 below:

TABLE 3

| Sample No. | Heavy Metals (as Pb) | Acid Soluble | Sulphide | Arsenic | Phosphate | Soluble Barium Salt | Acidity/ Alkalinity | $BaSO_4$ |
|---|---|---|---|---|---|---|---|---|
| 117 | <10 ppm | <0.1% | Pass | <0.8 ppm | Pass | Pass | Pass | 99.9% |
| 118 | <10 ppm | <0.1% | Pass | <0.8 ppm | Pass | Pass | Pass | 99.9% |
| 119 | <10 ppm | <0.1% | Pass | <0.8 ppm | Pass | Pass | Pass | 99.9% |
| 131 | <10 ppm | 0.25% | Pass | <0.8 ppm | Pass | Pass | Pass | 99.7% |
| 132 | <10 ppm | 0.08% | Pass | <0.8 ppm | Pass | Pass | Pass | 99.9% |
| 133 | <10 ppm | 0.27% | Pass | <0.8 ppm | Pass | Pass | Pass | 99.7% |
| 134 | <10 ppm | 0.07% | Pass | <0.8 ppm | Pass | Pass | Pass | 99.9% |
| 135 | <10 ppm | 0.06% | Pass | <0.8 ppm | Pass | Pass | Pass | 99.9% |
| 136 | <10 ppm | 0.04% | Fail | <0.8 ppm | Pass | Pass | Pass | 99.9% |
| 137 | <10 ppm | 0.08% | Pass | <0.8 ppm | Pass | Pass | Pass | 99.9% |
| 138 | <10 ppm | 0.15% | Pass | <0.8 ppm | Pass | Pass | Pass | 99.8% |
| 139 | <10 ppm | 0.16% | Pass | <0.8 ppm | Pass | Pass | Pass | 99.8% |
| 145 | <10 ppm | 0.17% | Pass | <0.8 ppm | Pass | Pass | Pass | 99.8% |
| 146 | <10 ppm | 0.16% | Pass | <0.8 ppm | Pass | Pass | Pass | 99.8% |
| 147 | <10 ppm | 0.12% | Pass | <0.8 ppm | Pass | Pass | Pass | 99.8% |
| 148 | <10 ppm | 0.16% | Pass | <0.8 ppm | Pass | Pass | Pass | 99.8% |

EXAMPLE II

Using the same procedure as in EXAMPLE I, a Brookfield ore was crushed, screened and subjected to gravity separation.

Four samples from the wet table fractions were then leached. The samples were:

| | |
|---|---|
| AS-1 | All C-1's |
| AS-2 | C-1, C-2, C-3 (−35+60) |
| AS-3 | C-1, C-2, C-3 (−60+150) |
| AS-4 | C-1, C-2, C-3 (−150) |

The leaching was carried out in a rotatable and tiltable plastic drum using 25% by weight of 20° Beaume hydrochloric acid based on each wet table sample. The leach was continued for 24 hours at room temperature with the drum rotating at a rate of about 1 r.p.m. At the end of 24 hours the acid was dumped out of the drum and the barium sulfate remaining was thoroughly washed with tap water.

The leached samples were submitted to an independent testing laboratory where they were tested according to the procedures for Barium Sulfate of the U.S. Pharmacopeia XVIII. The results obtained were as follows:

TABLE 4

|  | AS-1 | AS-2 | AS-3 | AS-4 |
|---|---|---|---|---|
| Acidity | Pass | Pass | Pass | Pass |
| Acid Soluble Substances | Pass | Pass | Pass | Pass |
| Phosphate | Pass | Pass | Pass | Pass |
| Sulfide | Pass | Pass | Pass | Pass |
| Arsenic | Pass | Pass | Pass | Pass |
| Soluble Barium Salts | Pass | Pass | Pass | Pass |
| Heavy Metals | Pass | Pass | Pass | Pass |

The embodiments of the invention in which an exclusive property or privilege is claimed are defined as follows:

1. A process capable of producing pharmaceutical barium sulphate containing at least 99.7% $BaSO_4$ and less than 10 ppm of heavy metals, which comprises grinding a naturally occurring barite ore containing individual crystals of substantially pure barium sulphate together with iron carbonate and silica as the predominant gangue minerals to form a granular ore material having a particle size of −35 mesh, passing this granular ore through a high intensity wet magnetic separator to remove magnetic particles, leaving a non-magnetic fraction containing barium sulphate and low specific gravity minerals, subjecting the non-magnetic fraction to gravity separation to separate a substantially pure barium sulphate fraction, subjecting this barium sulphate fraction to further grinding in an attrition mill with a particulate grinding medium which is non-contaminating of the pure barium sulphate to form a finely divided barium sulphate having a maximum particle size in the order of about 1 micron, leaching the finely divided barium sulphate fraction with a mineral acid selected from the group consisting of hydrochloric and sulphuric acid to remove acid soluble impurities and washing the leached product.

2. A process according to claim 1 wherein the magnetic separator is a Jones high intensity wet magnetic rotary separator.

3. A process according to claim 1 wherein the ore contains a major proportion of barium sulphate together with minor proportions of gangue materials selected from a group consisting of iron carbonates, iron oxides, silica and iron silicates.

4. The process according to claim 1 wherein the grinding medium is selected from the group consisting of steel shot, nickel shot and stainless alloy shot.

5. The process according to claim 4 wherein the shot has average diameters of less than ¼ inch.

6. A process according to claim 1 wherein the gravity separation is conducted on a wet shaking table.

7. A process according to claim 6 wherein the non-magnetic fraction separated from the magnetic fraction is divided into two or more separate fractions based on particle size range and these fractions are separately subjected to the gravity separation.

* * * * *